United States Patent

[11] 3,628,397

| [72] | Inventor | John M. Sheesley<br>Houston, Tex. |
|---|---|---|
| [21] | Appl. No. | 841,318 |
| [22] | Filed | July 14, 1969 |
| [45] | Patented | Dec. 21, 1971 |
| [73] | Assignee | Research Engineering Company<br>Houston, Tex. |

[54] VALVE ACTUATOR
1 Claim, 2 Drawing Figs.

[52] U.S. Cl. .................................................. 74/625,
74/459
[51] Int. Cl. ............................................ F16h 35/00,
F16h 55/22
[50] Field of Search ........................................... 74/625,
459; 251/14, 266

[56] References Cited
UNITED STATES PATENTS

| 2,590,745 | 3/1952 | Wuensch | 74/625 |
| 3,029,060 | 4/1962 | Anderson | 74/625 |
| 3,378,224 | 4/1968 | Boyle | 251/14 |
| 3,385,561 | 5/1968 | Whalen | 251/14 |
| 3,402,912 | 9/1968 | Watkins | 251/14 |
| 2,757,896 | 8/1956 | Sangster | 251/266 |

*Primary Examiner*—Milton Kaufman
*Assistant Examiner*—Wesley S. Ratliff, Jr.
*Attorney*—Robert W. B. Dickerson ABSTRACT: An actuator for operating a valve having a reciprocating operating stem may comprise: housing; a piston disposed in the housing and operable by fluid pressure on one side of the piston to move the piston in a first direction, the piston being connected to the valve stem; a spring biasing the piston in a second direction; and a shaft mounted in the housing for rotation only in threaded engagement with a nut member attached to the piston for reciprocation of the piston on rotation of the shaft. The shaft and nut member may comprise components of a ball screw mechanism in which their engagement is accomplished through ball bearings carried by the thread grooves of said shaft and nut.

John M. Sheesley
INVENTOR.

BY Bill B Berryhill
ATTORNEY

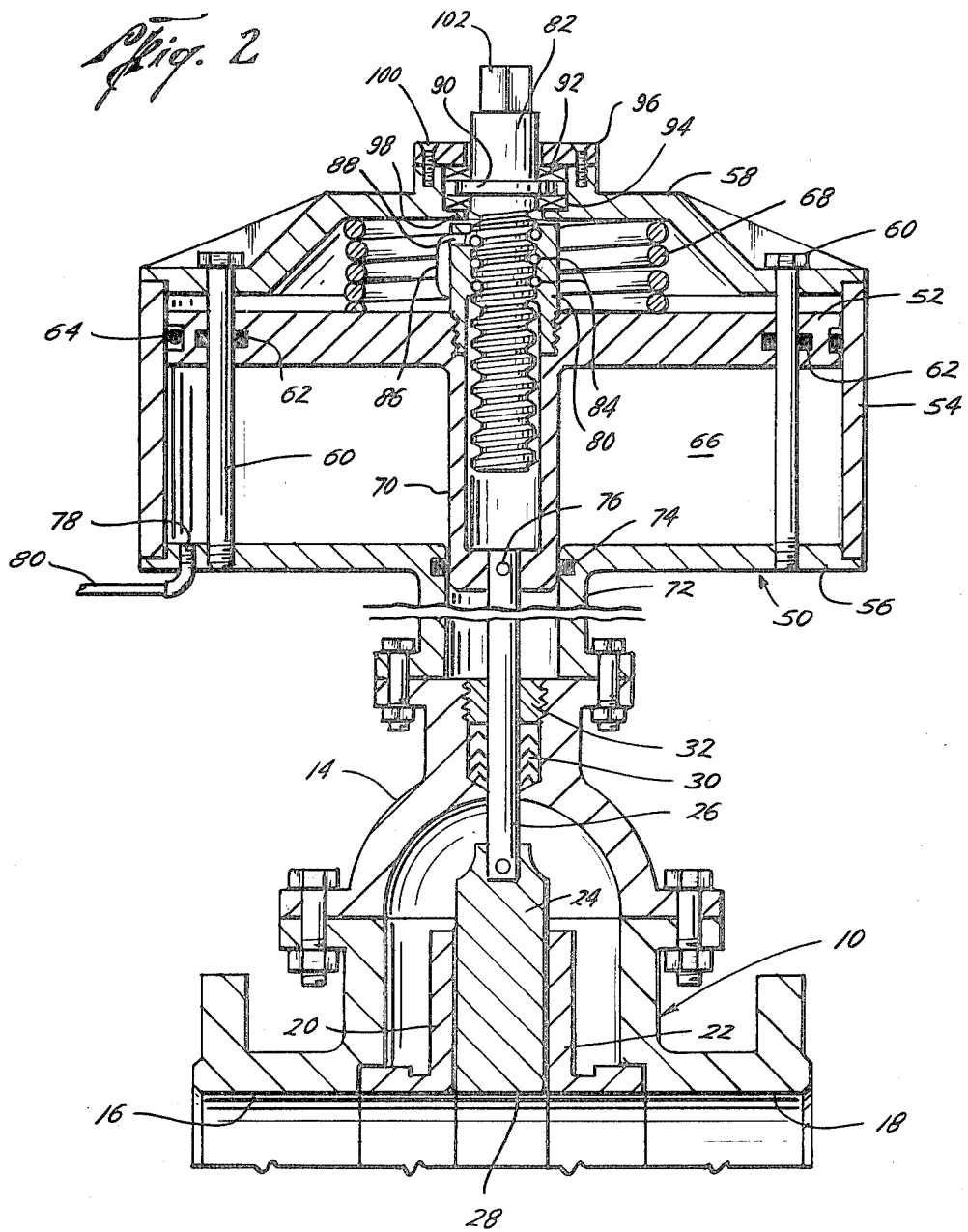

VALVE ACTUATOR

BACKGROUND OF THE INVENTION

1. Field of the Invention

This invention concerns piston-type actuators for valves or the like. More specifically it concerns a piston actuator for a valve adapted for optional manual operation.

2. Description of the Prior Art

Combination manual- and piston-operated valve actuators have been known for some time in the prior art. Some of the later designs are shown in U.S. Pat. Nos. 3,029,060 and 3,402,912. However, in the combination piston- and manual-operated actuators of the prior art, in which the piston is axially aligned with a rising valve stem, the shaft for manual operation rises and falls with the piston. It also rises and falls when manually operated. This results in a high silhouette space-consuming installation. In addition, some actuators of the prior art incorporate sliding seals which must also accommodate rotation of one of the actuator's components. This naturally reduces the life of seals and creates maintenance problems. A further disadvantage of prior art designs lies in the fact that after manual operation in one direction, it is usually necessary to return manually to the initial position before piston operation can resume.

SUMMARY

The present invention provides a combination manual- and piston-operated actuator in which the shaft for manual operation is mounted for rotation only and does does not fall with the actuator piston or during manual operation. This is made possible through a unique ball-screw mechanism connecting the piston to the shaft for manual operation. In fact, the shaft is the screw portion of the ball-screw mechanism. By rotating the screw the piston and attached valve stem may be reciprocated to manually operate the valve. In fluid operation, the piston moves along the screw causing it to rotate but not reciprocate.

An extension from the piston is connected to the stem of the valve to be operated. A sliding seal is provided around the extension and the piston, isolating the fluid pressure cylinder through the use of simple sliding seals which are not required to accommodate rotation at the same time, as in most of the prior art.

Other features and advantages of the invention pointed out in the claims can best be set forth in the description which follows.

BRIEF DESCRIPTION OF THE DRAWINGS

For a detailed description of a preferred embodiment of the invention, reference will be made to the accompanying drawings, but this is only exemplary of the invention which can be varied by one skilled in the art. In the drawings:

FIG. 2 is an elevation view, partially in section, showing the actuator of FIG. 1 in the valve-opened position.

DESCRIPTION OF THE PREFERRED EMBODIMENT

Figure 1:
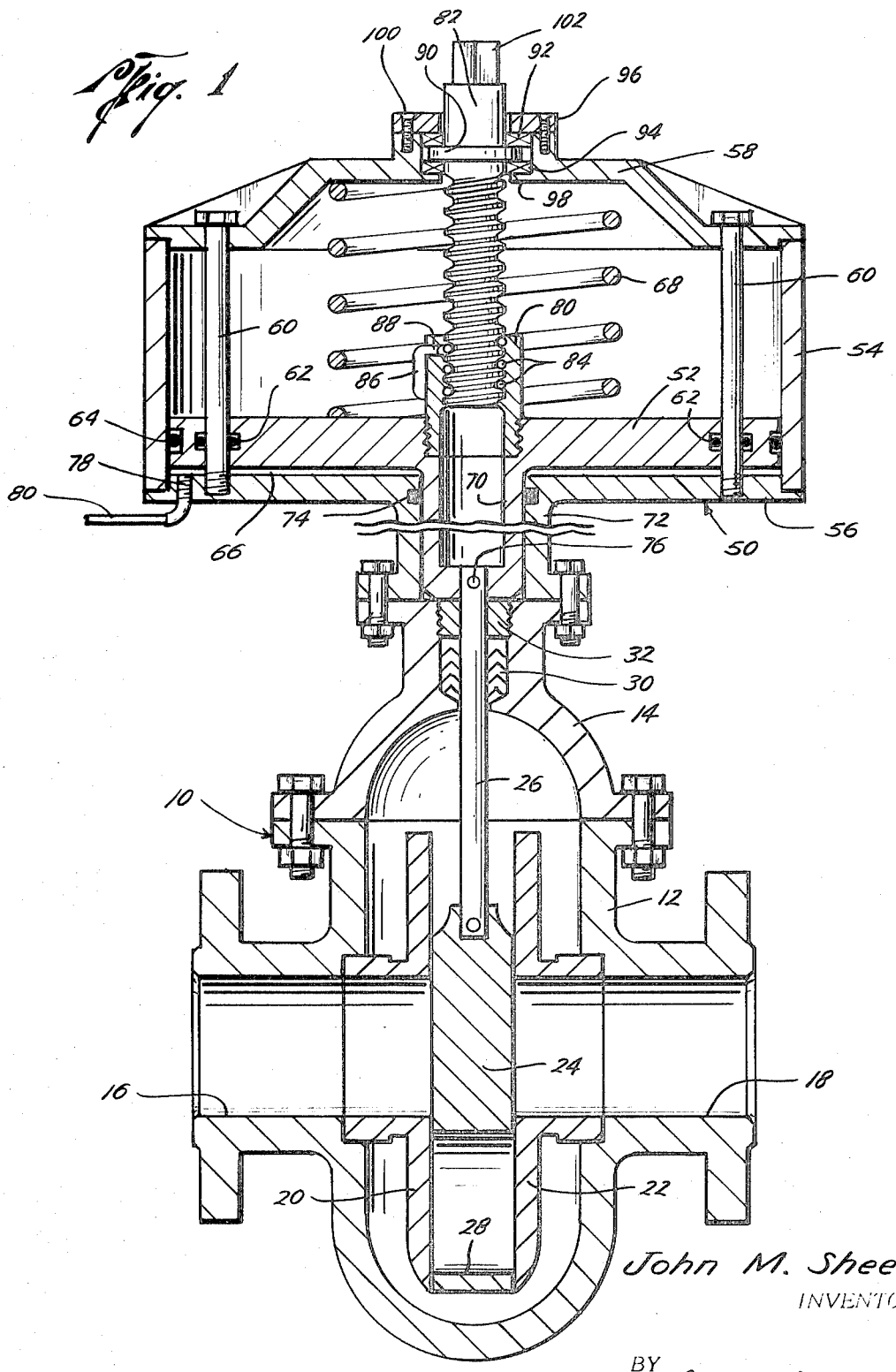
FIG. 1 is an elevation view, partially in section, of a gate valve utilizing an actuator according to a preferred embodiment of the invention shown in the valve-closed position.

Referring now to the drawings, the reference number 10 is a conventional-type gate valve having a body 12, bonnet 14, inlet and outlet conduits 16, 18, seat members 20, 22 and a reciprocating gate member 24. Attached to the upper end of gate member 24 is a valve stem 26 which, when reciprocated, causes gate member 24 to reciprocate from a closed position, as shown, to an open position in which the gate opening 28 is axially aligned with conduits 16 and 18. The bonnet 14 is provided with the usual packing 30 and packing bushing 32 for packing around stem 26. Further description of valve 10 is unnecessary, since it is well known in the art. Other type valves and devices could also be used, the one shown being for descriptive purposes only.

Attached at the upper end of valve 10 to bonnet 14 is an actuator, designated generally by the reference number 50. The actuator comprises a piston member 52 mounted in a housing formed by cylinder 54 closed at one end by plate 56 and at the other by another plate or head 58. Plates 56, 58 and cylinder 54 are held together by bolts 60. Bolts 60 also pass through holes provided therefor in piston 52 and serve as guides on which the piston 52 may reciprocate, but preventing rotation of the piston. Seals 62, 64 are provided around bolts 60 and piston 52, respectively, to prevent pressure escape from a pressure chamber 66 formed by cylinder 54, plate 56 and piston 52. A spring 68 is coaxially mounted on the opposite side of piston 52, biasing it in a direction opposite that to which forces are applied to piston 52 by virtue of the fluid pressure in chamber 66. The side of piston 52 to which pressure is applied and on which the spring 68 is mounted, could very easily be reversed. The determining factor is dictated by the particular type valve and its fail-safe position.

Piston 52 is provided with a tubular extension 70 which projects out of chamber 66 and is slidingly received in a cylindrical hub portion 72 of housing plate 56. An annular seal 74 is provided around extension 70 to prevent fluid pressure loss from chamber 66. The stem 26 of valve 10 may be connected at its upper end to piston 54 by any number of methods. The one shown provides a hole in the end of extension 70 in which the stem may be nonrotatingly affixed by a pin 76.

For fluid pressure operation, pressure may be applied to chamber 66 through a port 78 and conduit 80 to force piston 52 upwardly, compressing spring 68 to the position shown in FIG. 1. Since stem 26 is connected to the piston, the gate member 24 is reciprocated in this motion from its initial position (closed in this case) to a second position (opened in this case). The upper portion of the housing above piston 52 may be vented to atmosphere through a vent (not shown) in head 58 to prevent pressure resistance to the upward movement of piston 52. To return piston 52 and gate 24 to their first positions, pressure is simply released from chamber 66 allowing compressed spring 68 to force the gate back to its closed position. As can be easily understood, this arrangement also provides a fail-safe feature in that the valve would be forced to its closed position should there be a failure of fluid pressure.

To provide the actuator with a manual-operating capability a ball-screw mechanism is employed. The ball-screw mechanism comprises a nut member 80, screw member 82 and ball bearings 84. Ball-screw mechanisms are known, but the present application and arrangement is unique. As is known, the ball bearings 84 provide connection between screw 82 and nut 80 by engagement with the external thread grooves of screw 82 and internal thread grooves of nut 80. A return tube 86 communicates with these thread grooves at the upper and lower end of nut 80 through ports in the wall of nut 80 such as the one shown at the upper end of nut 80 and designated by the reference numeral 88. As is known, the rotation of screw 82 will cause nut 80 to be driven longitudinally along screw 82 if the nut is not allowed to rotate. This causes the ball bearings 84 to be fed through the threads into one end of return tube 86 and out the other for recycling through the threads again. The direction of feed is determined by the rotational direction of screw 82. An important feature of ball-screw mechanisms resides in the fact that the nut may be easily displaced longitudinally along the screw causing the screw to rotate. This feature, not present in ordinary threaded connections, is due to the reduced friction made possible by the ball bearings.

The upper end of screw 82 may be provided with a bearing shoulder 90 on either side of which may be mounted bearings 92 and 94. Bearings 92, 94 and screw 82 may be mounted in head 58 and retained by a bearing plate 96 and shoulder 98. Bearing plate 96 is held in place by screws 100 and is provided with a central aperture through which the end of screw 82 projects to provide a means of engagement 102 with a manual operating device such as a handwheel.

For manual operation of valve 10, it is simply a matter of rotating screw 82 in one direction for opening the valve. Since the nut 80 is affixed to piston 52, rotation of the screw 82, to drive nut 80 therealong, also causes reciprocation of stem 26 and the gate 24. Contrary to the prior art the manual operating shaft or screw 82 does not rise and fall with the reciprocation of stem 26. It only rotates. When the valve reaches the second position (opened in this case) the manual operating means, such as a handwheel is latched in this position by any type of latch device (not shown). To return the valve to its initial position the latch is released and the force of the compressed spring 68 drives nut 80 along screw 82 returning the piston 52, stem 26 and gate 24 to their original positions.

Another important feature of the present invention resides in the fact that it is not necessary to manually return the valve to its initial position before resuming pressure piston operation. For instance, assume that due to pressure failure the valve 10 has been manually opened and the actuator latched in the position shown in FIG. 2. The pressure failure is corrected and it is desired to resume piston operation. All that is necessary is to return fluid pressure to chamber 66 and release the latch-holding screw shaft 82. The actuator is now under pressure control again without having to close valve 10 again, as in actuators of the prior art.

Thus, the invention provides a combination manual and piston operated actuator of unusual characteristics. Its unique design allows manual operation while maintaining a low silhouette or profile. It allows resumption of pressure operation after manual operation without resetting the piston. Furthermore, the pressure chamber seals are required to accommodate reciprocating motion only. All of this is accomplished in a relatively simple and efficient construction.

I claim:

1. An actuator for actuating a valve having a reciprocating elongate operating stem comprising: a housing; a piston slidably disposed in said housing and operable by fluid pressure on one side of said piston to move the piston toward a first end of said housing, said piston being connected to said valve stem through a cylindrical extension of said piston which is in sliding and sealing engagement with a passageway through one end of said housing; a spring biasing said piston toward a second end of said housing; and a ball bearing mechanism comprising a nut member attached to said piston and a screw member rotatably mounted on bearings at one end of said housing, said nut member being threadedly engaged with said screw member through ball bearings carried by said nut for circulation from one end of said nut to the other, one end of said screw member projecting through an aperture in said housing and adapted for engagement with manual operating means for rotation of said screw to reciprocate said nut member and said piston within said housing; and including guide rods longitudinally disposed in said housing and in sliding engagement with said piston through apertures therein, said one side of said piston being pressure isolated by seals around said piston, around said rods and around said extension.

* * * * *